(12) United States Patent
Allen et al.

(10) Patent No.: US 6,296,546 B1
(45) Date of Patent: Oct. 2, 2001

(54) INDEX TABLE AND DRIVE MECHANISM FOR A CHEMICAL MECHANICAL PLANARIZATION MACHINE

(75) Inventors: Robert F. Allen; Ricardo T. Jordan, both of Gilbert, AZ (US)

(73) Assignee: SpeedFam-IPEC Corporation, Chandler, AR (US)

(*) Notice: Subject to any disclaimer, the term of this patent is extended or adjusted under 35 U.S.C. 154(b) by 0 days.

(21) Appl. No.: 09/356,787

(22) Filed: Jul. 20, 1999

Related U.S. Application Data

(62) Division of application No. 08/908,902, filed on Aug. 8, 1997, now Pat. No. 5,975,986.

(51) Int. Cl.[7] .................................................. B24B 7/22
(52) U.S. Cl. .......................... 451/5; 451/288; 74/813 R
(58) Field of Search .......................... 451/5, 288, 287, 451/41, 339, 334, 65; 74/813 R, 813 C, 816

(56) References Cited

U.S. PATENT DOCUMENTS

| | | | |
|---|---|---|---|
| 3,710,482 | * 1/1973 | Grafford | 29/203 B |
| 4,987,765 | * 1/1991 | Nishimura et al. | 72/405 |
| 5,694,685 | * 12/1997 | Millas | 29/890.031 |
| 5,784,932 | * 7/1998 | Gilberti | 74/813 R |
| 5,950,503 | * 9/1999 | Amendolea | 74/813 R |
| 6,046,432 | * 4/2000 | Addison et al. | 29/596 |
| 6,081,986 | * 7/2000 | Miyano | 29/563 |

FOREIGN PATENT DOCUMENTS

402139173 * 5/1990 (JP) ...................................... 451/388

* cited by examiner

*Primary Examiner*—Robert A. Rose
(74) *Attorney, Agent, or Firm*—Snell & Wilmer LLP

(57) ABSTRACT

A machine for polishing semiconductor wafers including a rotatable index table and a drive mechanism for the index table. The index table temporarily accommodates wafers between processing steps. The drive mechanism includes a continuously circulating grooved timing belt that engages gear teeth formed on an outside diameter portion of the index table to effect rotation of the index table. The index table includes a large diameter central opening for accommodating passage of other system components.

5 Claims, 6 Drawing Sheets

INDEX TABLE AND DRIVE MECHANISM FOR A CHEMICAL MECHANICAL PLANARIZATION MACHINE

RELATED APPLICATIONS

This application is a Divisional of U.S. patent application Ser. No. 08/908,902, filed Aug. 8, 1997, now U.S. Pat. No. 5,975,986.

TECHNICAL FIELD OF THE INVENTION

The present invention relates generally to machines for polishing or planarizing workpieces such as silicon wafers and, more particularly, relates to an index table and an index table drive mechanism used in conjunction with such machines.

BACKGROUND OF THE INVENTION

Many electronic and computer-related products such as semiconductors, hard disks and CD-ROMS require highly polished or planarized surfaces in order to achieve optimum performance. In the semiconductor manufacturing industry, for example, silicon workpieces are used in the manufacture of integrated circuit components and the like. The workpieces are known in the industry as "wafers" and typically have a flat, circular disk-like shape. The wafers are initially sliced from a silicon ingot and, thereafter, undergo multiple masking, etching, and dielectric and conductor deposition processes to create microelectronic structures and circuitry on the wafers. The surface of a wafer undergoing these processes typically must be polished or planarized between processing steps to ensure proper flatness, permitting use of photolithographic processes for building additional dielectric and metallization layers on the wafer surface.

Chemical Mechanical Planarization (CMP) machines have been developed to polish or planarize silicon wafer surfaces to the flat condition necessary for manufacture of integrated circuit components and the like. CMP processes and machines are known in the art and are described in several U.S. Patents. Examples include U.S. Pat. No. 4,805,348, issued in February 1989, to Arai, et al.; U.S. Pat. No. 4,811,522, issued in March 1989 to Gill; U.S. Pat. No. 5,099,614, issued in March, 1992 to Arai et al.; U.S. Pat. No. 5,329,732, issued in July, 1994 to Karlsrud et al.; U.S. Pat. No. 5,476,414, issued in December 1995 to Masayoshi et al.; U.S. Pat. Nos. 5,498,196 and 5,498,199, both issued in March, 1996 to Karlsrud et al.; and U.S. Pat. No. 5,558,568, issued in September 1996 to Talieh et al.

Known CMP machines and processes typically include loading and unloading stations where wafers are loaded into and unloaded from wafer transport cassettes, as well as a polishing station or table where the wafers are polished. A transition station is ordinarily positioned between the load/unload stations and the polishing station to temporarily accommodate wafers as they are transferred between processing stations. The wafers are usually moved between the load/unload stations and the transition station through the use of precision robotics and transfer flippers, and are transported between the transition station and polishing station through the use of a multiple head wafer transport apparatus.

In conventional CMP machines, the transition station takes the form of a rotatable index table having a plurality of alternating receive and discharge stations for holding wafers. The index table rotates or indexes as necessary to position wafers for transfer to and from the load/unload stations as well as for transfer to and from the polishing station. The wafers may be submerged in deionized water or another similar processing solution while they are present on the index table.

Prior art index tables of this sort, while adequate in most respects, do have several drawbacks. Rotation of prior art index tables is accomplished through use of a motor-driven indexing shaft which extends through an opening formed in the center of the table. The indexing shaft engages gear teeth or bolt patterns formed around the inside diameter of the central opening such that rotation of the shaft effects rotation of the table. In conventional CMP machines, however, the central opening of the table has a small diameter (in the range of five inches) which creates difficulty since other tubing, mechanisms, support structures, drains and so forth must also be passed through the opening. The tight fit of the components passed through the opening can lead to undesirable and destructive chaffing or rubbing between the components and the rotating table. Moreover, if the CMP machine includes a secondary polishing table, the space limitations described above, as well as other control limitations, dictate that the secondary table be driven by belt coupling or otherwise mechanically linking it to the main polishing table drive mechanism. Consequently, there is no independent speed control for the two tables. This is a significant drawback, as it is sometimes desirable to rotate the tables at different speeds simultaneously. One example is where it is desired to polish wafers with the secondary table while simultaneously applying conditioner to the polishing pad of the main table.

SUMMARY OF THE INVENTION

The present invention provides a novel index table and drive mechanism which addresses and resolves the shortcomings of the prior art described above, and also provides additional advantages over conventional drive mechanism for index tables.

In accordance with one aspect of the present invention, a processing machine including a plurality of stations for processing workpieces is provided. The machine includes rotatable index table means for properly positioning the workpieces for transfer to and from the processing stations. The index table means has an outside diameter portion with belt engagement means formed thereon. The machine also includes a drive mechanism for effecting incremental rotation of the index table means. The drive mechanism includes a continuously circulating belt which mates with the belt engagement means.

In accordance with another aspect of the present invention, a machine is provided for polishing semiconductor wafers. It comprises a loading station for receiving and holding the wafers prior to polishing, an unloading station for receiving and holding the wafers after polishing, and a polishing station for polishing the wafers. The machine also comprises a transition station for temporarily accommodating wafers as they are transferred between loading, unloading, and polishing stations. The transition station includes a rotatable index table having belt engagement means formed around its outside diameter. The transition station also includes a drive mechanism having a movable belt which engages the belt engagement means to effect rotation of the table such that the table is properly positioned for receiving and discharging wafers. Finally, the machine includes transfer means for transferring the wafers between loading, unloading, polishing and transition stations.

In accordance with a further aspect of the present invention, a drive mechanism for providing incremental rotation of a circular member is provided. The drive mechanism includes a grooved belt which is circulated in a continuous loop. The outside diameter of the circular member has gear means formed thereon. The belt mates with the gear means to effect rotation of the circular member.

These and other aspects of the present invention are described in more detail in the following description, attached drawing figures and claims.

BRIEF DESCRIPTION OF THE DRAWING FIGURES

DETAILED DESCRIPTION OF PREFERRED EMBODIMENTS OF THE INVENTION

Figure 1:
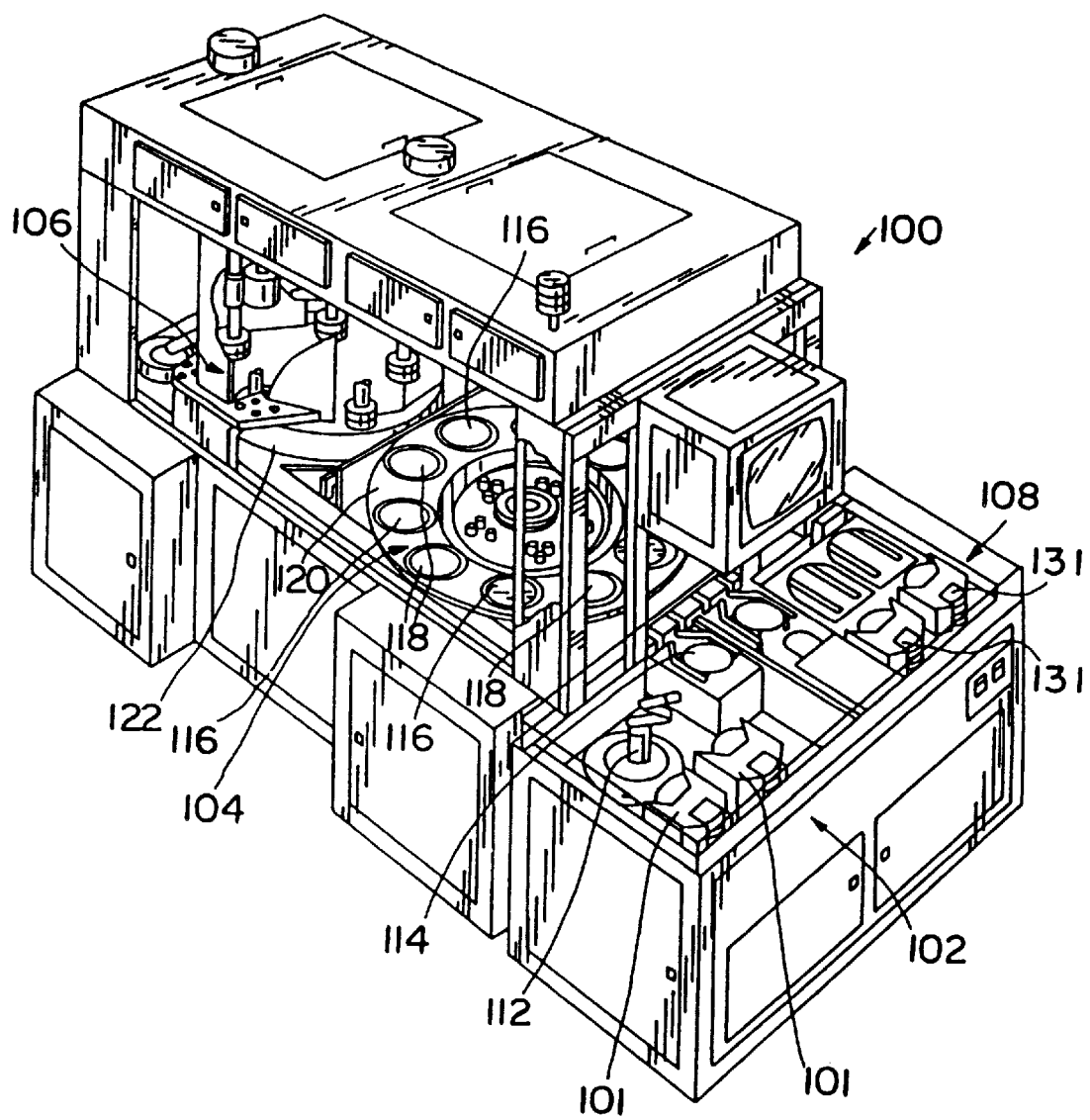
FIG. 1 is a perspective view of an exemplary CMP machine showing a conventional index table and drive mechanism arrangement.
Figure 2:
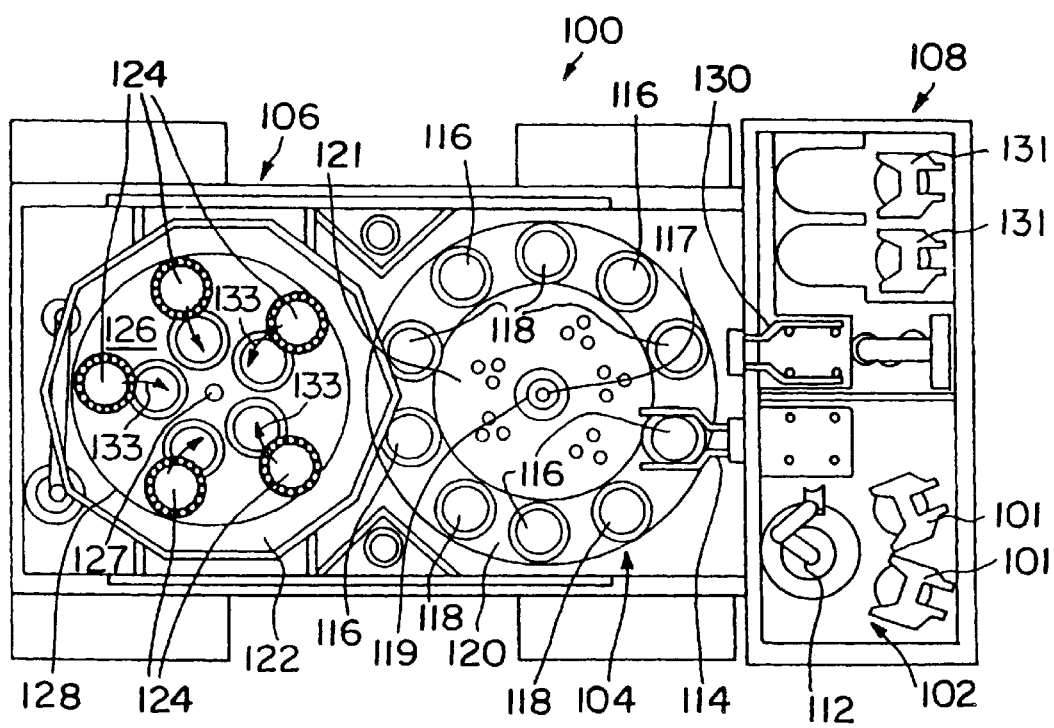
FIG. 2 is a top view of the machine shown in FIG. 1.

Referring now to FIGS. 1 and 2, an exemplary CMP machine 100 having a conventional index table and table drive mechanism is shown. While the inventive index table and drive mechanism disclosed herein is intended to replace the index table and drive mechanism illustrated in FIGS. 1 and 2, it should be appreciated that the present invention could also be employed in different types of CMP machines or in conjunction with any other machine or operation wherein a controlled rotating or indexing motion is required or desirable. The particular CMP machine described below is presented for background purposes only.

CMP machine 100 comprises a multiple head wafer polishing machine which, briefly, unloads wafers from cassettes, transfers the wafers through polishing and rinsing stations, and reloads the wafers into cassettes for further processing. Load cassettes 101, each including a plurality of wafers to be processed, are positioned at load station or compartment 102. A loading robotic arm 112 sequentially retrieves the wafers one at a time from cassettes 101 and transports them to a transfer arm or "flipper" 114. Flipper 114 moves the wafer through a semi-circular profile to wafer transition station 104. Transition station 104 comprises a rotatable index table 120 having a plurality of alternating receive stations 116 and discharge stations 118. Table 120 is typically filled with deionized water or another similar processing solution. After flipper 114 has deposited a wafer in a receive station 116 and has moved away, table 120 rotates or indexes such that the next empty receive station 116 is aligned with flipper 114 for receipt of a wafer. This process continues until all receive stations 116 have received wafers.

Rotation or indexing of conventional index tables, such as the illustrated table 120, is accomplished through use of a motor-driven indexing shaft 119 which extends through central opening 117 formed in table 120. Shaft 119 engages a bolt pattern or gear teeth (not shown) formed around the inside diameter of opening 117 to fix shaft 119 and table 120 for rotational movement. Opening 117 typically has a diameter in the range of five inches and, in addition to shaft 119, accommodates passage of tubes, drains, support structures and other mechanisms necessary to operation of CMP machine 100. Moreover, a secondary polishing table may be mounted in the central area of index table 120.

To pick up wafers for polishing, multiple head wafer transport apparatus 122 is moved laterally from polishing station 106 into transition station 104 such that it is aligned over table 120. Apparatus 122 includes a plurality of individual carrier elements 124 that are positioned directly above receive stations 116. Apparatus 122 is lowered until the wafers in receive stations 116 are captured by carrier elements 124, and is then raised away from table 120. Apparatus 122 is then moved laterally back into polishing station 106. Once in polishing station 106, apparatus 122 is lowered such that the wafers held by carrier elements 124 are pressed against polishing pad 126, which is mounted on and spun about its vertical axis 127 by a lap wheel 128. Carrier elements 124 also spin the wafers about their vertical axes and oscillate the wafers back and forth radially across pad 126 (substantially along arrow 133) as they press against pad 126. In this manner, the undersurfaces of the wafers are polished or planarized. As noted above, a second polishing pad may be located in the space 121 located in the center of index table 120. Hence, once picked up by apparatus 122, the wafers may be subjected to two separate polishing operations.

When polishing is finished, apparatus 122 lifts the wafers away from the polishing table and moves back toward transition station 104. Carrier elements 124 are positioned such that they are aligned above discharge stations 118, and then lowered to discharge the polished wafers into discharge stations 118. Once apparatus 122 has moved away, table 120 is rotated such that a discharge station 118 is aligned with transfer arm or "flipper" 130. Flipper 130 lifts the wafer out of the discharge station and moves it into rinse and unload station 108. Once rinsed, the wafer is loaded into an unload cassette 131. Table 120 indexes to the next discharge station, and the process is repeated until all of the polished wafers have been removed from the table. Once an unload cassette is full, an operator may transport the cassette to further processing or packaging locations.

Index table 120 and shaft drive mechanism 119, as configured and described above, suffer from several shortcomings. First, the typically small diameter of central opening 117 leads to logistical problems in accommodating the sometimes large number of system components which must be passed through the opening. Even if all components can be accommodated, forcing a large number of system components through a small, rotating opening inevitably leads to deleterious rubbing and wear on the parts.

The space problems created by the small central opening of the index table are a contributing factor to a second problem. When a secondary polishing table is mounted in the central portion of the index table, space limitations dictate that it be belt coupled or otherwise mechanically linked to the main polishing table (126). Hence, it must be driven at the same speed as the main polishing table. This is a disadvantage as it is often desirable and/or necessary to rotate the tables at different speeds for different applications. While the secondary polishing table is polishing wafers at a first velocity, for example, conditioner might be applied to the polishing pad of the main table at a second velocity. If the tables are mechanically linked and must be driven at the same speed, however, the two operations cannot be carried out simultaneously.

A third drawback of conventional CMP configurations is the operative location of the drive shaft and associated indexing mechanisms underneath the platform or table. This inconvenient location is difficult to access and complicates servicing and maintenance of the drive mechanisms.

Figure 3:
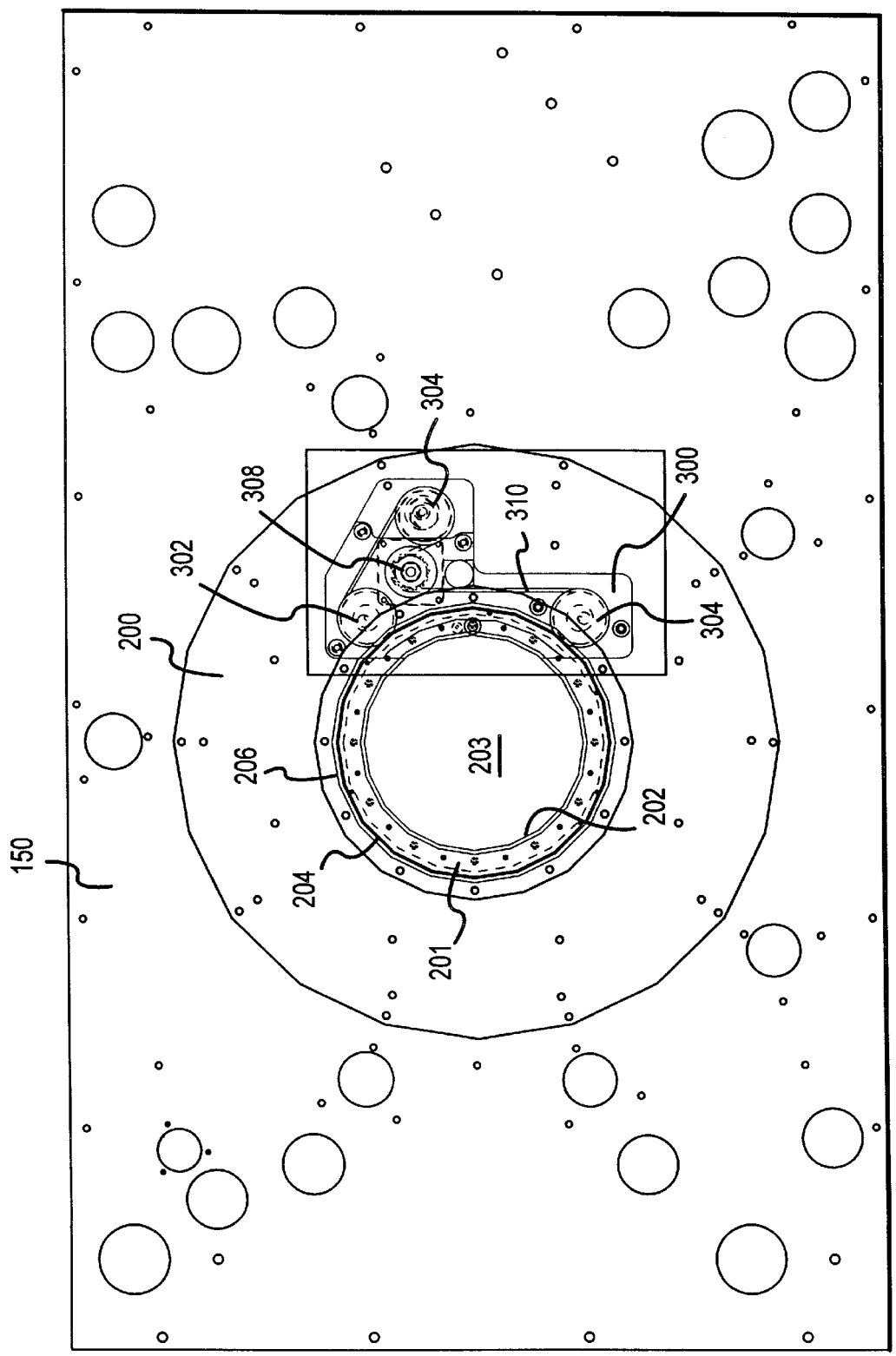
FIG. 3 is a top plan view of an index table and drive mechanism according to the present invention.

An index table 200 and drive mechanism 300 according to the present invention are illustrated in FIG. 3. Table 200 and drive mechanism 300, while described in conjunction with a CMP machine as shown and described in FIGS. 1 and 2, could also be incorporated into other CMP configurations. It should also be appreciated that the drive mechanism arrangement could be used in conjunction with other machines or automated systems wherein rotation or incremental indexing of a table or other machinery component is desired. Essentially, the present invention provides the ability to incrementally rotate or index a ring of virtually infinite diameter.

Index table 200 is rotatably mounted on a flat surface or platform 150 of a CMP machine. As described above, table 200 will typically include a plurality of receive and discharge stations (not shown in FIG. 3) for holding wafers awaiting polishing or that have been polished. Table 200 has a ring-like shape and surrounds a central opening 202. Opening 202 has a diameter in the range of ten (10)–twelve (12) inches. This diameter is significantly larger than the typical diameters of central openings in prior art index tables, which are usually in the range of five inches. While the opening size of index table 200 shown and described herein is considered sufficient to comfortably accommodate all system components which must be passed therethrough, the opening could be made larger if necessary. The only limiting factor on the size of opening 202 is the availability of a suitably sized bearing to fit within the opening.

Often, a secondary polishing table is mounted within central portion 203 of the index table. In past configurations, the relatively small diameter of the central opening of the index table created problems in accommodating the drive shaft and support pedestal associated with the secondary polishing table. The present index table 200, by contrast, has a much larger central opening and eliminates the problems associated with the smaller diameter central openings of past configurations. The central opening provides sufficient room for passage of the support pedestal of the secondary table, as well as the associated drains, tubing, controls and other components while eliminating the problems of chaffing or rubbing of the components while the table is rotating.

The additional space created by the enlarged central opening relieves space limitations of past configurations and permits use of a third motor so that the index table, the secondary polishing table and the main polishing table can each be driven at different speeds simultaneously. This is advantageous as the speeds at which the tables must be rotated often varies widely. Typically, for example, the secondary polishing table would be rotated at a velocity in the range of 10–50 (usually above 40) revolutions per minute. By contrast, if conditioner were simultaneously being applied to the polishing pad of the main table, velocities in the range of 20–45 revolutions per minute would be appropriate for the main table.

Figure 6:
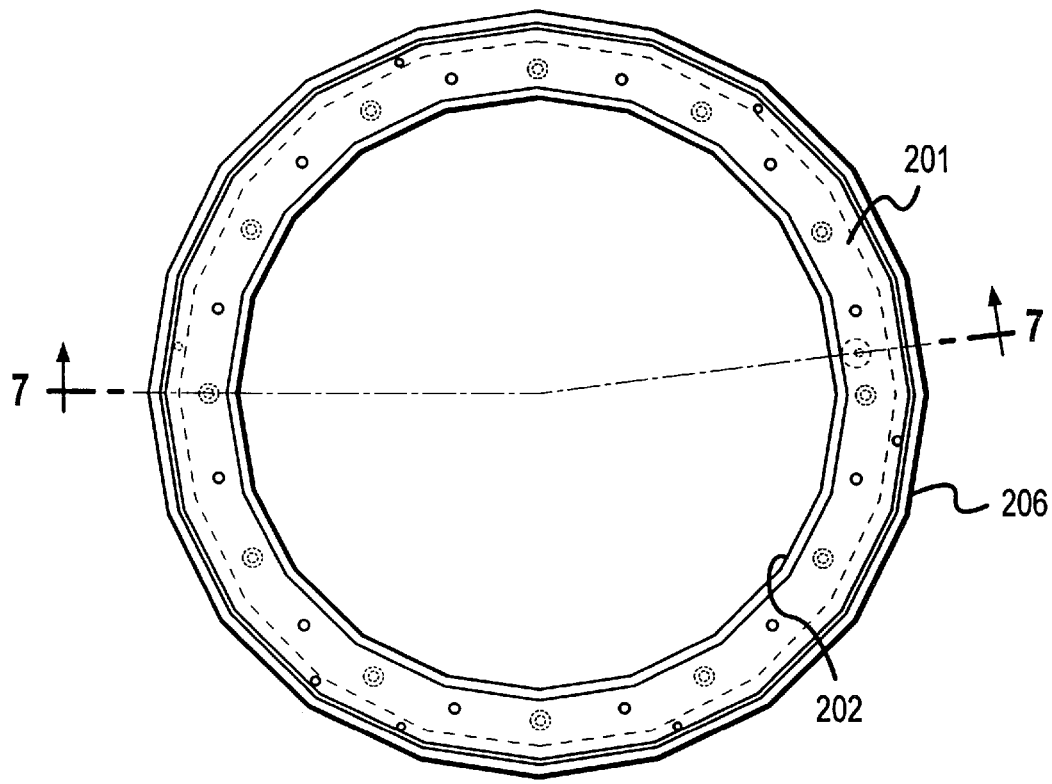
FIG. 6 is an exploded, top plan view of the index table of FIG. 3.
Figure 7:
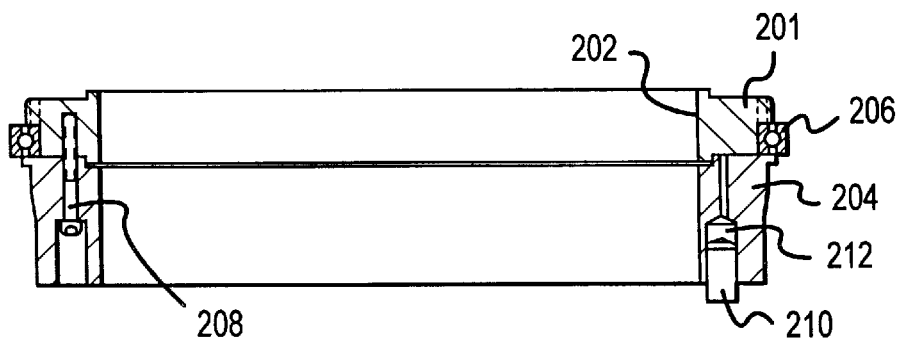
FIG. 7 is a sectional view taken through lines 7—7 of FIG. 6.

Table 200 rests on an upper table support ring 201 and a lower gear ring 204. A large diameter bearing 206 is disposed between support ring 201 and gear ring 204. The configuration of support ring 201, gear ring 204 and bearing 206 is illustrated in more detail in FIGS. 6 and 7. Gear ring 204 includes gear teeth formed on its outside diameter that are configured to mate with gear teeth formed on an engaging belt drive mechanism (to be described in more detail herein). Bearing 206 may be an appropriate standard, off-the-shelf, large diameter bearing. Additional seals may be employed in conjunction with the bearing to ensure that fluids and other moisture in the area do not infiltrate the bearing or other system components. Support ring 201 and gear ring 204 are secured together by appropriate fasteners 208, such as a screws or pins.

Figure 4:
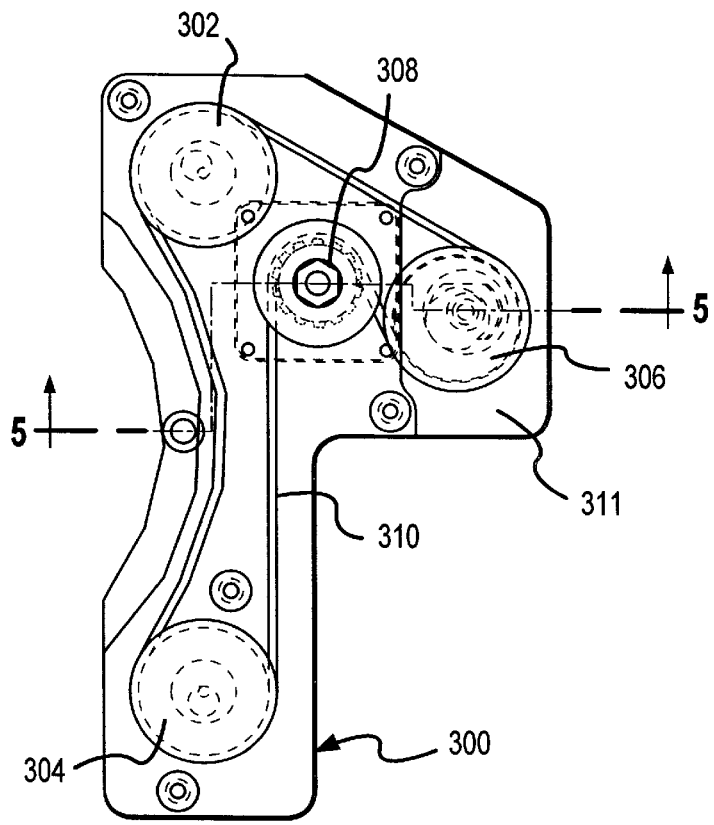
FIG. 4 is an exploded, top plan view of the drive mechanism of FIG. 3.
Figure 5:
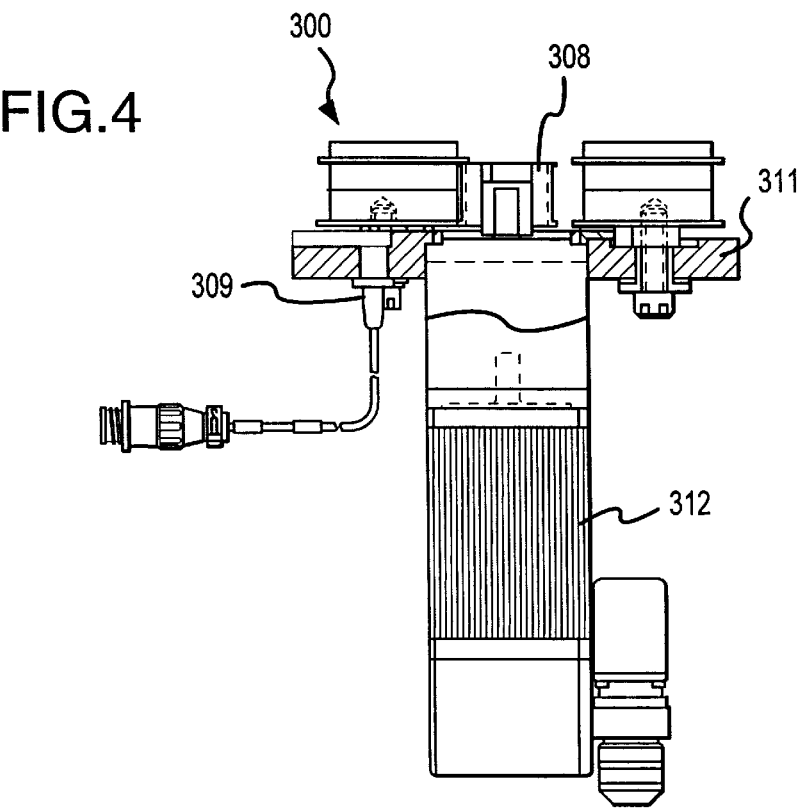
FIG. 5 is a sectional view taken through lines 5—5 of FIG. 4.

Table 200 is rotated or indexed by drive mechanism 300. Drive mechanism 300, illustrated in detail in FIGS. 4 and 5, is mounted on CMP platform 150 adjacent index table 200. It includes a continuous grooved timing belt 310 wrapped around drive pulleys 302 and 304, idler pulley 306 and motor gear 308. The pulleys and gears are mounted on support plate 311, which is affixed to CMP platform 150. Motor gear 308 is driven by motor 312 which is disposed below CMP platform 150. The grooves formed in belt 310 are configured to mate with the gear teeth formed in the outside diameter of gear ring 204. Hence, when motor 312 is operated to effect circulation of belt 310 about pulleys 302, 304 and 306, and gear 308, the mating engagement between belt 310 and gear ring 204 effects corresponding rotation of index table 200.

Accurate positioning of index table 200 is facilitated through the use of a magnetic pin or dowel 210 fit into a recess 212 formed in the bottom of gear ring 204. A magnetic sensor 309 (FIG. 5) appropriately mounted to the CMP machine detects magnetic pin 210 and is thereby able to calibrate or offset the table to a home or other desired position. Prior CMP machines required the use of more complicated flag and sensor components to properly calibrate the table.

Belt 310 is a grooved timing belt and should be fabricated from a material that minimizes the number of particulates generated as belt 310 circulates and engages the pulleys and gear teeth. Polyurethane reinforced with steel is an example of a suitable material for belt 310. A tensioning component or material is also integrated into belt 310. It is important that belt 310 be tensioned or permanently "stretched" an amount sufficient to ensure that it does not lose rotational fixation to gear ring 204. The tensioning component, such as a steel cable, should be spiraled or otherwise extended through the belt in one continuous piece, as opposed to being wrapped or dispersed through the belt in individual segments, in order to minimize the potential for destructive breaking or splicing of the tensioning component. Frictional components engaging the drive belt are preferably fabricated from anodized aluminum.

The continuous nature of belt 310 is advantageous in that it facilitates a potentially infinite number of revolutions of table 200. Use of a fixed length of belt physically attached to the table at some point would be too restrictive in that the table could be indexed only a fixed amount in either rotational direction. The driving engagement of the belt at the outside edge of table 200, as opposed to the prior use of a shaft or spindle indexed to the inside diameter of the table, is also advantageous in that the deflection enrollment and bending moment are reduced through the use of the enlarged diameter of the drive gear.

While motor 312 may be any suitable motor, preferably it is a component of a control system provided by Berkeley Process Controls. The processing and control system of motor 312 provides greatly improved torque sensing ability.

This improved ability is advantageous in a number of respects. Conventional CMP machines are problematic in that indexing of the table is sometimes initiated before the overhead apparatus has been completely retracted or has fully cleared the index table and associated components. Accordingly, interference between the table and associated components and the overhead apparatus may occur. Since past systems do not have the capability to detect or sense the increased torque which is occasioned by interference or contact between parts, when the interference is finally noticed, it is usually due to a machine stall caused by a collision. At this point, damage to the product or tool has already occurred. In the present system, by contrast, if an interference occurs, it is immediately sensed by the motor and the table is stopped before any damage is incurred by the tool or components. An alarm can be sounded and the operator can inspect the machine and correct the problem.

The torque sensing ability provided by the present invention is also useful in other respects. If chaffing and rubbing of tubing and other components against the index table and/or secondary polishing table is occurring, for example, a change in torque indicative of an operations abnormality will be sensed. Essentially, the torque range for normal operations can be determined and any sensed torque out of that range will function as a signal that some type of problem or anomaly is present.

The mounting of belt 310 and the pulleys and gears associated with drive mechanism 300 on support plate 311, which in turn is mounted on worksurface 150, is advantageous in that it minimizes operations disruptions and delays when it becomes necessary to service the drive mechanism. If any of the drive components become damaged or are otherwise in need of maintenance, the whole unit can simply be removed for servicing and replaced with another unit. There is no need to hinder operations while individual components are removed or serviced. Previous systems required complicated and dangerous procedures such as disassembly of pulley stacks weighing in excess of 100 pounds.

Figure 8:
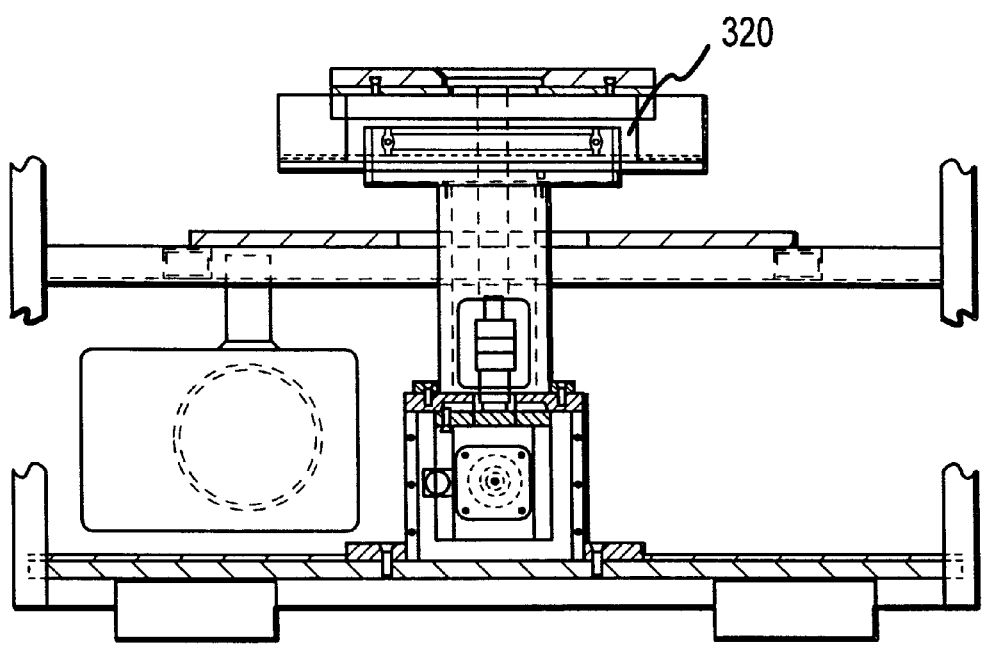
FIG. 8 is a side sectional view of the index table and drive mechanism of FIG. 3.

The introduction of moist air into the drive apparatus can cause damaging oxidation of the apparatus components. In order to prevent moisture from entering the internal portions of the apparatus, a gas such as dry nitrogen is introduced into volumetric space 320 underneath index table 200 (FIG. 8). Preferably, the nitrogen is applied at a positive pressure of approximately three pounds per square inch in order to force moist air out of the apparatus and thereby extend its functional life.

The present invention has been described with reference to several particular embodiments and drawing figures. It should be understood, however, that modification may be made to the particular embodiments described herein without departing from the spirit and scope of the invention as represented in the following claims.

What is claimed is:

1. In a processing machine including a plurality of stations for processing workpieces, rotatable index table means for properly positioning said workpieces for transfer to and from said processing stations, said index table means including an outside diameter portion having belt engagement means formed thereon, and a drive mechanism for effecting incremental rotation of said index table means, said drive mechanism including a continuously circulating belt which mates with said belt engagement means, wherein said belt engagement means comprise gear teeth configured to mate with grooves formed in said belt and wherein said index table means includes a ring-shaped table surrounding a central opening, an upper table support ring which is disposed below and supports said table, and a lower gear ring fixed underneath said support ring, said gear teeth being formed in said lower gear ring.

2. A machine as claimed in claim 1, wherein a bearing is disposed between said upper table support ring and said lower gear ring.

3. A machine as claimed in claim 2, wherein said drive mechanism further comprises drive pulleys, an idler pulley and a motor gear, said belt being wrapped around said drive pulleys, idler pulley and motor gear in a continuous loop, said motor gear being driven by a motor to effect circulation of said belt around said drive pulleys, idler pulley and motor gear, said belt engaging a portion of said gear teeth to effect rotation of said index table and said belt not surrounding said index table.

4. A drive mechanism for providing incremental rotation of a circular member, said drive mechanism including a grooved belt circulating in a continuous loop, said circular member including an outside diameter having gear means formed thereon, said belt mating with said gear means to effect rotation of said circular member, wherein said belt engages only a portion of said outside diameter of said circular member and does not surround said circular member.

5. A drive mechanism as claimed in claim 4, wherein said circular member is an index table which forms a part of a machine for polishing semiconductor wafers.

* * * * *